United States Patent
McColloch et al.

(10) Patent No.: US 8,768,116 B2
(45) Date of Patent: Jul. 1, 2014

(54) OPTICAL CROSS-CONNECT ASSEMBLY AND METHOD

(71) Applicant: Avago Technologies General IP (Singapore) Pte. Ltd., Singapore (SG)

(72) Inventors: Laurence R. McColloch, Santa Clara, CA (US); Mitchell H. Fields, Needham, MA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 84 days.

(21) Appl. No.: 13/631,407

(22) Filed: Sep. 28, 2012

(65) Prior Publication Data

US 2014/0093211 A1    Apr. 3, 2014

(51) Int. Cl.
  *G02B 6/28* (2006.01)
  *G02B 6/32* (2006.01)
  *G02B 6/38* (2006.01)

(52) U.S. Cl.
  USPC ............... 385/24; 385/33; 385/59; 385/65; 385/71; 385/74

(58) Field of Classification Search
  USPC .................... 385/24, 33, 59, 65, 71, 74
  See application file for complete search history.

(56) References Cited

U.S. PATENT DOCUMENTS

| | | | |
|---|---|---|---|
| 5,600,748 A * | 2/1997 | Kosaka | 385/59 |
| 5,892,870 A | 4/1999 | Fingler et al. | |
| 5,907,651 A | 5/1999 | Bunin et al. | |
| 6,085,003 A | 7/2000 | Knight | |
| 6,594,436 B2 | 7/2003 | Sun et al. | |
| 6,860,645 B2 | 3/2005 | Miller et al. | |
| 6,918,703 B2 | 7/2005 | Chen et al. | |
| 6,931,195 B2 | 8/2005 | Lemoff | |
| 7,003,869 B2 | 2/2006 | Lutzen et al. | |
| 7,197,224 B2 | 3/2007 | Rolston et al. | |
| 7,220,065 B2 | 5/2007 | Han et al. | |
| 7,280,733 B2 | 10/2007 | Larson et al. | |
| 7,356,216 B1 * | 4/2008 | Martin et al. | 385/18 |
| 7,469,080 B2 * | 12/2008 | Strasser et al. | 385/17 |
| 7,543,994 B2 | 6/2009 | McColloch | |
| 7,553,091 B2 | 6/2009 | McColloch | |
| 7,794,156 B2 | 9/2010 | Wang et al. | |

(Continued)

FOREIGN PATENT DOCUMENTS

| | | |
|---|---|---|
| CN | 201796164 U | 4/2011 |
| JP | 2006010871 A | 1/2006 |

OTHER PUBLICATIONS

MTP Solutions for High Density Networks, 2010, p. 1-22, FireFab, United Kingdom.
MTP Backplane Interconnect System (BMTP), p. 1, Molex.

*Primary Examiner* — Ryan Lepisto

(57) ABSTRACT

An optical cross-connect assembly and method are provided that are suitable for use in both small-scale and large-scale applications. The optical cross-connect assembly comprises first and second stacks of multi-optical fiber connector modules that are configured to orthogonally mechanically couple with one another such that the optical ports of each of the connector modules of the first stack are optically aligned with respective optical ports of all of the connector modules of the second stack, and such that the optical ports of each of the connector modules of the second stack are optically aligned with respective optical ports of all of the connector modules of the first stack.

20 Claims, 10 Drawing Sheets

(56) References Cited

U.S. PATENT DOCUMENTS

| | | |
|---|---|---|
| 7,905,751 B1 | 3/2011 | Davis |
| 8,002,477 B2 | 8/2011 | Colgan et al. |
| 8,036,500 B2 | 10/2011 | McColloch |
| 2007/0036480 A1* | 2/2007 | Wu ................................ 385/16 |
| 2008/0095502 A1 | 4/2008 | McColloch |
| 2010/0220953 A1 | 9/2010 | Kewitsch et al. |

* cited by examiner

OPTICAL CROSS-CONNECT ASSEMBLY AND METHOD

TECHNICAL FIELD OF THE INVENTION

The invention relates to optical communications. More particularly, the invention relates to an optical cross-connect assembly and method for use in optical communications.

BACKGROUND OF THE INVENTION

An optical cross-connect assembly is an assembly that is used to interconnect optical fiber communications modules with one another. An optical fiber communications module may be an optical transceiver module having both transmit and receive optical channels, an optical transmitter module having only transmit optical channels, or an optical receiver module having only receive optical channels. An optical cross-connect assembly may be used to interconnect many such optical communications modules with many other such optical communications modules.

Optical cross-connect assemblies take on a variety of forms depending on the applications in which they are used. In smaller-scale applications, printed circuit boards (PCBs) having electrical-to-optical and optical-to-electrical conversion elements coupled to fiber assemblies and optical waveguides are used as optical cross-connects to optically interface one or more optical communications modules with one or more other optical communications modules. In larger-scale applications, many optical communications modules are contained in boxes that are held in slots of large racks. In these types of applications, it is not feasible to use PCB solutions to optically interface the boxes with one another. The optical cross-connect assemblies that are used in these types of applications are typically optical fiber cables having LC or MTP connectors on each end that are manually connected to ports of the boxes.

In some larger-scale applications, it is necessary to optically interconnect all of the boxes in a rack or multiple racks with all of the other boxes in the same racks. Each box typically contains one or more processor elements (PEs), such as, for example, central processing units (CPUs), application specific integrated circuits (ASICs), or application-specific standard products (ASSPs) that enable an interconnect, switching, routing, or other such function. By interconnecting all of the boxes with all of the other boxes, all of the PEs of all of the boxes can be configured to operate as a single large-scale system. In computing applications, optical cross-connect assemblies are used to enable the construction of supercomputers. In routing and switching applications, optical cross-connect assemblies are used to make large numbers of interconnections for the purposes of switching or routing large amounts of data between large numbers of sources and destinations. In redundant arrays of inexpensive disk (RAID) systems, often times the boxes in a rack or in multiple racks are interconnected to allow data that is stored in the memory device of each box to be duplicated, or striped, in the memory devices of all of the other boxes. In some larger-scale applications, all of the boxes of one or more racks are interconnected with all of the boxes of one or more other racks.

In all of these types of larger-scale applications, it can be difficult to connect each box to all of the other boxes using optical fiber cables and connectors. For example, assuming that a rack contains 128 boxes that must be interconnected with one another, each box would need to be connected to 128 transmit optical fiber cables and 128 receive optical fiber cables. This scenario corresponds to a radix of 128. Providing enough ports on each box to accommodate these interconnections can be difficult. Also, it is difficult to drive signals, especially at high speeds (e.g., gigahertz speeds), across electrical cables that have rack-sized lengths. Electrical cables are sometimes used within a rack to make interconnections between boxes, but it is impractical to use them over long distances due to the fact that they are bulky in size and very lossy, i.e., they waste a lot of electrical power at high speed and over long lengths. Making a PCB with optical waveguides on it that is large enough to accommodate this many interconnections is not practical because the PCB would have to be as large as the rack or large enough to span across multiple racks.

Accordingly, a need exists for an optical cross-connect assembly that is suitable for use in small-scale and large-scale applications, and particularly well-suited for use in high-radix applications where a large number of interconnections need to be made.

SUMMARY OF THE INVENTION

The invention is directed to an optical cross-connect assembly and method. The optical cross-connect assembly comprises first and second stacks of first and second multi-optical fiber connector modules, respectively. Each of the first connector modules includes a first module housing in which ends of a plurality of first optical fibers are held in fixed positions. Each of the first module housings has a plurality of first lenses disposed in respective first openings formed in a wall of the first module housing. The first openings extend through the wall and through a front surface of the first module housing. The ends of the first optical fibers are positioned adjacent the respective openings such that light is coupled between the respective first lenses and the respective ends of the first optical fibers.

Each of the second connector modules includes a second module housing in which ends of a plurality of second optical fibers are held in fixed positions. Each of the second module housings has a plurality of second lenses disposed in respective second openings formed in a wall of the second module housing. The second openings extend through the wall of the second module housing and through a front surface of the second module housing. The ends of the second optical fibers are positioned adjacent the respective second openings such that light is coupled between the respective second lenses and the respective ends of the second optical fibers.

The first and second stacks are orthogonally mechanically coupling together such that respective first openings of each of the first module housings are optically aligned with respective second openings of all of the second module housings and such that respective second openings of each of the second module housings are optically aligned with respective first openings of all of the first module housings.

The method comprises:
providing the first and second stacks of first and second multi-optical fiber connector modules having first ends of a plurality of first and second optical fibers held in fixed positions in first and second module housings, respectively, of the first and second connector modules, respectively;
mechanically and optically coupling second ends of the first plurality of optical fibers to a first component;
mechanically and optically coupling second ends of the second plurality of optical fibers to a second component; and
orthogonally mechanically coupling the first stack of connector modules with the second stack of connector module such that respective openings of each of the first module housings are optically aligned with respective openings of all of the second module housings and such that respective openings of each of the second module housings are optically aligned with respective openings of all of the first module housings.

These and other features and advantages of the invention will become apparent from the following description, drawings and claims.

DETAILED DESCRIPTION OF AN ILLUSTRATIVE EMBODIMENT

Figure 1:
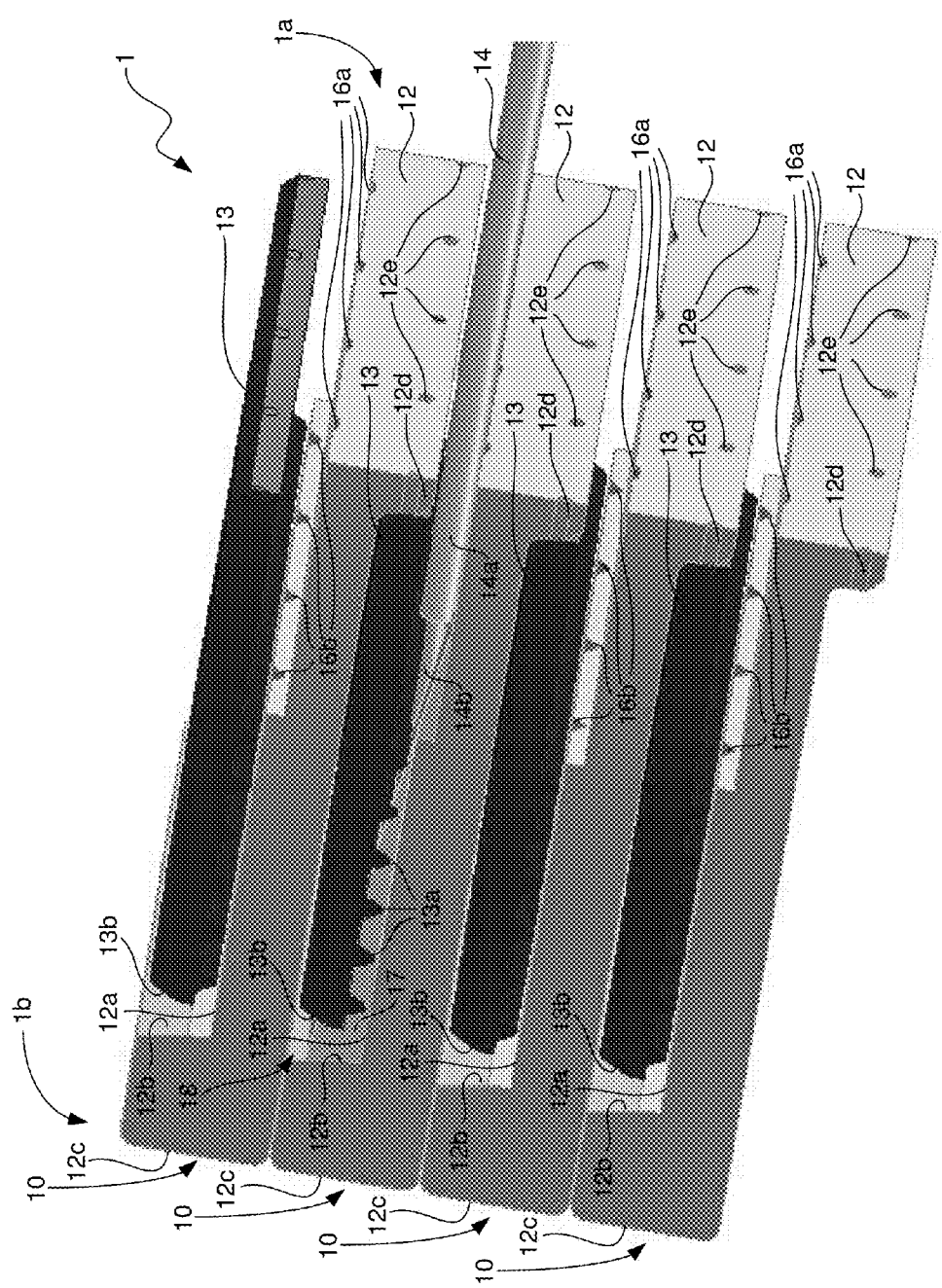
FIG. 1 illustrates a side perspective view of a stack of the multi-optical fiber connector modules that are used in the optical cross-connect assembly in accordance with an illustrative embodiment.

In accordance with embodiments of the invention, an optical cross-connect assembly and method are provided that are suitable for use in both small-scale and large-scale applications. The cross-connect assembly comprises first and second stacks of multi-optical fiber connector modules that are configured to orthogonally mechanically couple with one another such that the optical ports of each of the connector modules of the first stack are optically aligned with respective optical ports of all of the connector modules of the second stack, and such that the optical ports of each of the connector modules of the second stack are optically aligned with respective optical ports of all of the connector modules of the first stack. Illustrative, or exemplary, embodiments of the optical cross-connect assembly and method will now be described with reference to the figures, in which like reference numerals represent like elements, components or features. The elements, components or features in the figures are not necessarily drawn to scale.

FIG. 1 illustrates a side perspective view of a stack 1 of the multi-optical fiber connector modules 10 that are used in the optical cross-connect assembly in accordance with an illustrative embodiment. As will be described below in detail, the number of connector modules 10 that are used in a stack 1 to construct the optical cross-connect assembly will vary depending on the technological application, or environment, in which the assembly is used. For illustrative purposes, the stack 1 is shown in FIG. 1 as being made up of four connector modules 10. Each of the multi-optical fiber connector modules 10 comprises a module housing 12 and a cover 13. Each of the connector modules 10 connects to ends of a plurality of optical fibers, although only one of the connector modules 10 is shown in FIG. 1 connected to the ends of optical fibers 14 for purposes of clarity.

Figure 2:
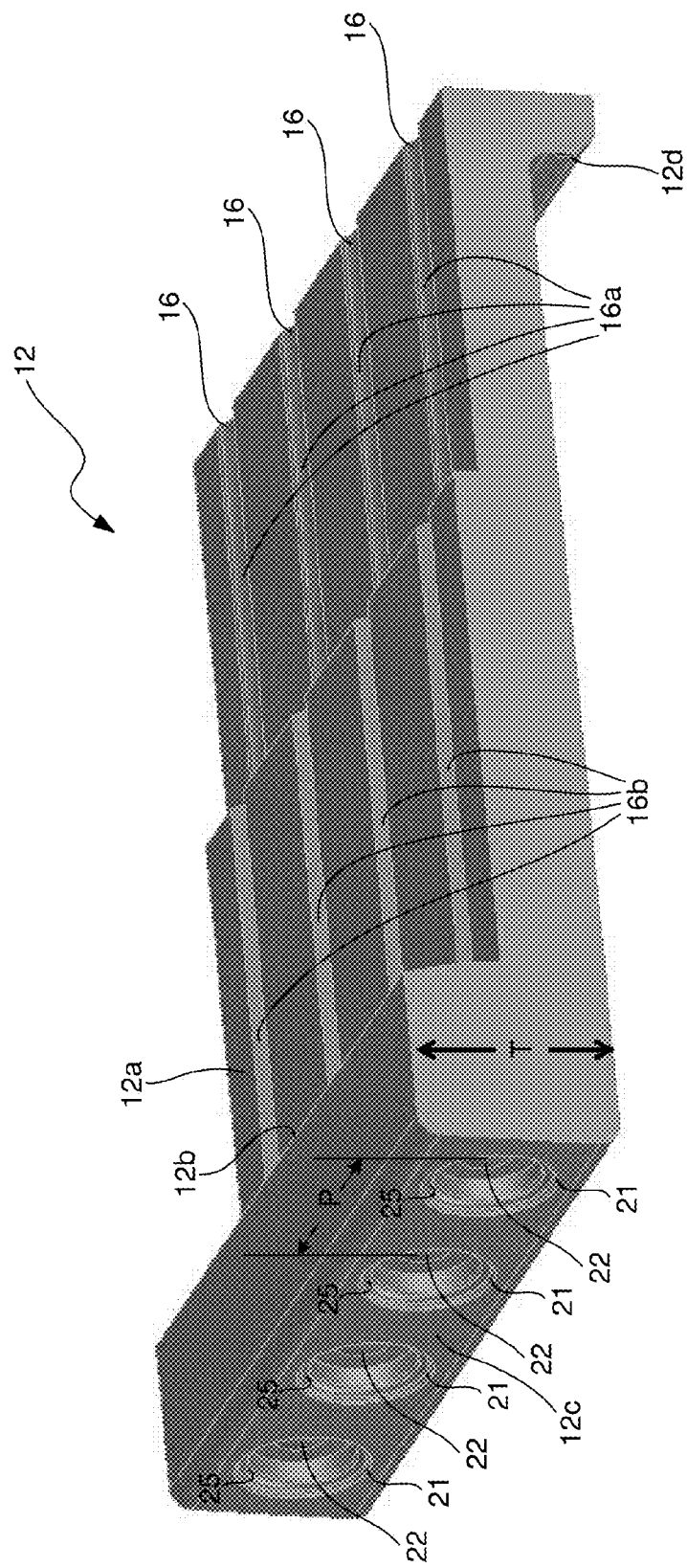
FIG. 2 illustrates a top perspective view of the module housing shown in FIG. 1 with the cover and the optical fibers removed.

FIG. 2 illustrates a top perspective view of the module housing 12 shown in FIG. 1 with the cover 13 and the optical fibers 14 removed. In accordance with this illustrative embodiment, each module housing 12 is configured to connect to ends of four optical fibers 14, i.e., each connector module 10 has four optical channels. It should be noted, however, that the invention is not limited with respect to the number of optical fibers that are connected to each connector module 10 or the number of optical channels that are provided in each connector module 10.

The module housing 12 is typically a molded, unitary plastic part, although the invention is not limited with respect to the composition of the module housing 12. As will be described below in more detail, the cover 13 is deformable to an extent and is typically made of unfilled plastic such as, for example, unfilled polyvinyl chloride (PVC), unfilled polycarbonate, unfilled cyclic olefin copolymer (COC), or unfilled nylon.

The multi-optical fiber connector module 10 has features that are similar or identical to features of a multi-optical fiber connector module and cover that are disclosed in U.S. Pat. No. 7,543,994 (hereinafter the '994 patent) and U.S. Pat. No. 7,553,091 (hereinafter the '091 patent), which are assigned to the assignee of the present application and which are incorporated by reference herein in their entireties.

An upper surface 12a of the module housing 12 has a plurality of grooves 16 formed in it for receiving respective optical fibers 14 (FIG. 1). Each groove 16 has a first portion 16a and a second portion 16b. The first portions 16a of the grooves 16 are generally semi-cylindrical in shape such that they are complementary in shape to the cylindrically-shaped outer surfaces of the jackets of the optical fibers 14. The second portions 16b of the grooves 16 are V-shaped. Prior to securing the ends of the optical fibers 14 to the module housing 12, each optical fiber 14 is cleaved and a portion of the jacket is removed, leaving a jacketed fiber portion 14a (FIG. 1) and an unjacketed fiber portion 14b (FIG. 1). The jacketed fiber portions 14a of the optical fibers 14 are positioned in the first portions 16a of the grooves 16 and the unjacketed fiber portions 14b are positioned in the second portions 16b of the grooves 16.

When the cover 13 is secured to the module housing 12, deformable features 13a disposed on the bottom of the cover 13 come into contact with the unjacketed fiber portions 14b of the optical fibers 14. The deformable features 13a are slightly deformed by the forces exerted by the unjacketed fiber portions 14b on the features 13a during placement of the cover 13 on the module housing 12. A soft sheet metal leaf spring (not shown) may be used during the placement process to apply an evenly-distributed force across the top surface of the cover 13 to cause the features 13a to be deformed. The deformed features 13a partially wrap around the unjacketed fiber portions 14b such that the unjacketed fiber portions 14b are pinned between the respective V-shaped second portions 16b of the grooves 16 and the deformed features 13a.

After the cover 13 has been placed and oriented on the module housing 2, as shown in FIG. 1, an adhesive material 17 that is transparent to the primary wavelength of the optical signals being carried on the optical fibers 14 is dispensed into a gap 18 that exists between a forward end 13b of the cover 13 and a wall 12b of the module housing 12. The adhesive material 17 has an index of refraction that is equal to, or approximately equal to, the index of refraction of the cores (not shown) of the fibers 14. The adhesive material 17 fills any imperfections in the cleaved ends of the optical fibers 14, thereby making the joints transparent to the optical beams so that no internal reflection occurs at this boundary.

When the adhesive material 17 is dispensed into the gap 18, it fills the gap 18 and flows between, and is in contact with, the bottom of the cover 13 and the unjacketed fiber portions 14b. The adhesive material 17 is also in contact with the upper surface 12a of the module housing 12 and with the wall 12b of the module housing 12. Thus, when the adhesive material 17 cures and becomes hardened, it fixedly secures the ends of the unjacketed fiber portions 14b within the respective V-shaped second portions 16b of the grooves 16 and fixedly secures the cover 13 to the module housing 12.

As shown in FIG. 1, the ends of the unjacketed fiber portions 14b are adjacent to, or in contact with, the wall 12b of the module housing 12. Respective openings 21 (FIG. 2) formed in the module housing 12 extend in the axial directions of the grooves 16 through the wall 12b and through a front surface 12c of the module housing 12. Within these openings, respective collimating lenses 22 (FIG. 2) are disposed in the module housing 12. Each opening 21 has a recessed circular ridge feature 25 that functions as a female mating feature for mating with a male mating feature (not shown) disposed on a mating multi-optical fiber connector module (not shown), as will be described below with reference to FIG. 3.

In accordance with this illustrative embodiment, the module housing 12 has a hook tail 12d on its back end. As can be seen in FIG. 1, when the connector modules 10 are stacked, the hook tail 12d of each module housing 12 comes into contact with a portion of the cover 13 that is secured to the module housing 12 below it, except for the lowermost module housing 12. The hook tails 12d are attached to the portions of the covers 13 that they are in contact with by an attachment mechanism, such as by a spot weld or by an adhesive material, such as epoxy or glue. For illustrative purposes, the hook tails 12d and the covers 13 are shown spot welded to each other. In accordance with the illustrative embodiment, the module housings 12 are made of a clear plastic material and the covers 13 are made of an opaque plastic material. In order to create the spot welds, a laser (not shown) is used to project laser light through the hooked tails 12d at locations 12e. The laser light passes through the hooked tails 12d and is incident on the opaque covers 13. The locations on the cover 13 on which the laser light is incident absorb the laser light and heat up to the point that spot welds are created between the cover 13 and the hooked tail 12d at those locations. These spot welds mechanically couple the modules 10 together on the back end 1a of the stack 1.

The portions of the modules 10 that are located nearer the front end 1b of the stack 1 than they are to the back end 1a of the stack 1 are not attached to one another such that these portions of the modules 10 are somewhat "floppy," i.e., they have some freedom to move relative to one another. This feature allows the front end 1b of the stack 1 to self-align with the front end (not shown) of an opposing stack when the stacks are mated with one another to form the cross-connect assembly, as will be described below in more detail with reference to FIG. 3.

Figure 3:
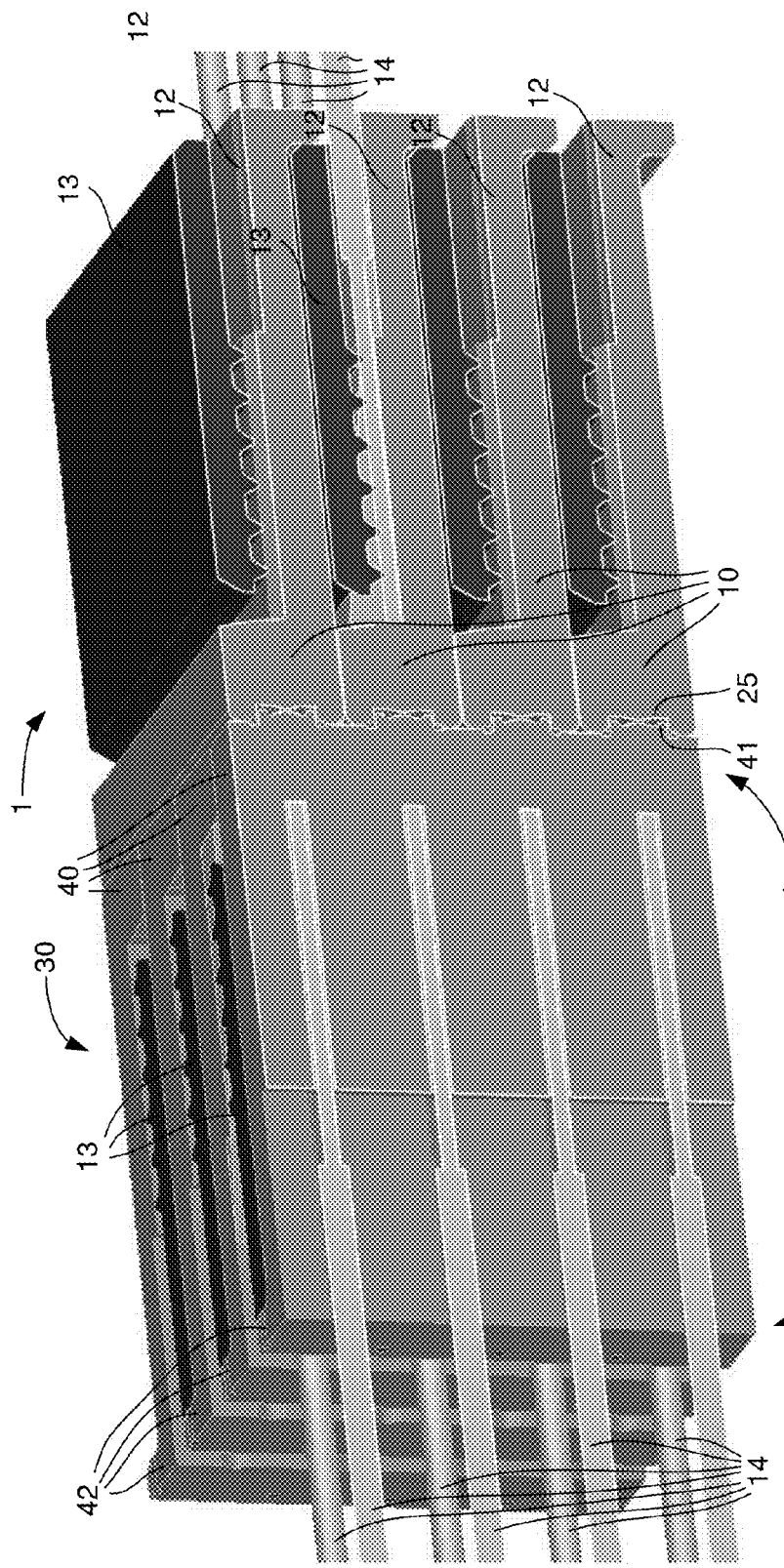
FIG. 3 illustrates a side cross-sectional view of the stack of multi-optical fiber connector modules shown in FIG. 1 mated with an opposing stack of multi-optical fiber connector modules.

FIG. 3 illustrates a side cross-sectional view of the stack 1 of multi-optical fiber connector modules 10 shown in FIG. 1 mated with an opposing stack 30 of multi-optical fiber connector modules 40. The connector modules 40 in accordance with this illustrative embodiment are identical to the connector modules 10 except that the module housings 42 of the connector modules 40 have protruding circular ridge features 41 that are complementary in shape to the recessed circular ridge features 25 (FIG. 1) of the connector modules 10. As with the connector modules 10 of the stack 1, the connector modules 40 of the stack 30 preferably are attached to one another at the back end 30a of the stack 30 by an attachment mechanism (e.g., spot welds or adhesive material), but are not attached to one another at the front end 30b of the stack 30 so that they also have the aforementioned "floppy" characteristic to facilitate self alignment of the opposing connector modules 10 and 40.

It can be seen in FIG. 3 that the stack 30 is orthogonal to the stack 1 such that each of the connector modules 40 is mechanically and optically coupled to all of the connector modules 10 and each of the connector modules 10 is mechanically and optically coupled to all of the connector modules 40. With reference again to FIG. 2, the thickness, T, of each module housing 12 is equal to the pitch, P, between the centers of the openings 21. Therefore, when the stacks 1 and 30 are brought into confrontation with one another as shown in FIG. 3, the protruding circular ridge features 41 of the connector modules 40 mate with the respective recessed circular ridge features 25 of the respective connector modules 10, which brings the respective lenses 22 of the opposing connector modules 10 and 40 into optical alignment with one another. The reason for orthogonally coupling the stacks 1 and 30 together will be described below in detail with reference to FIG. 6.

Figure 4:
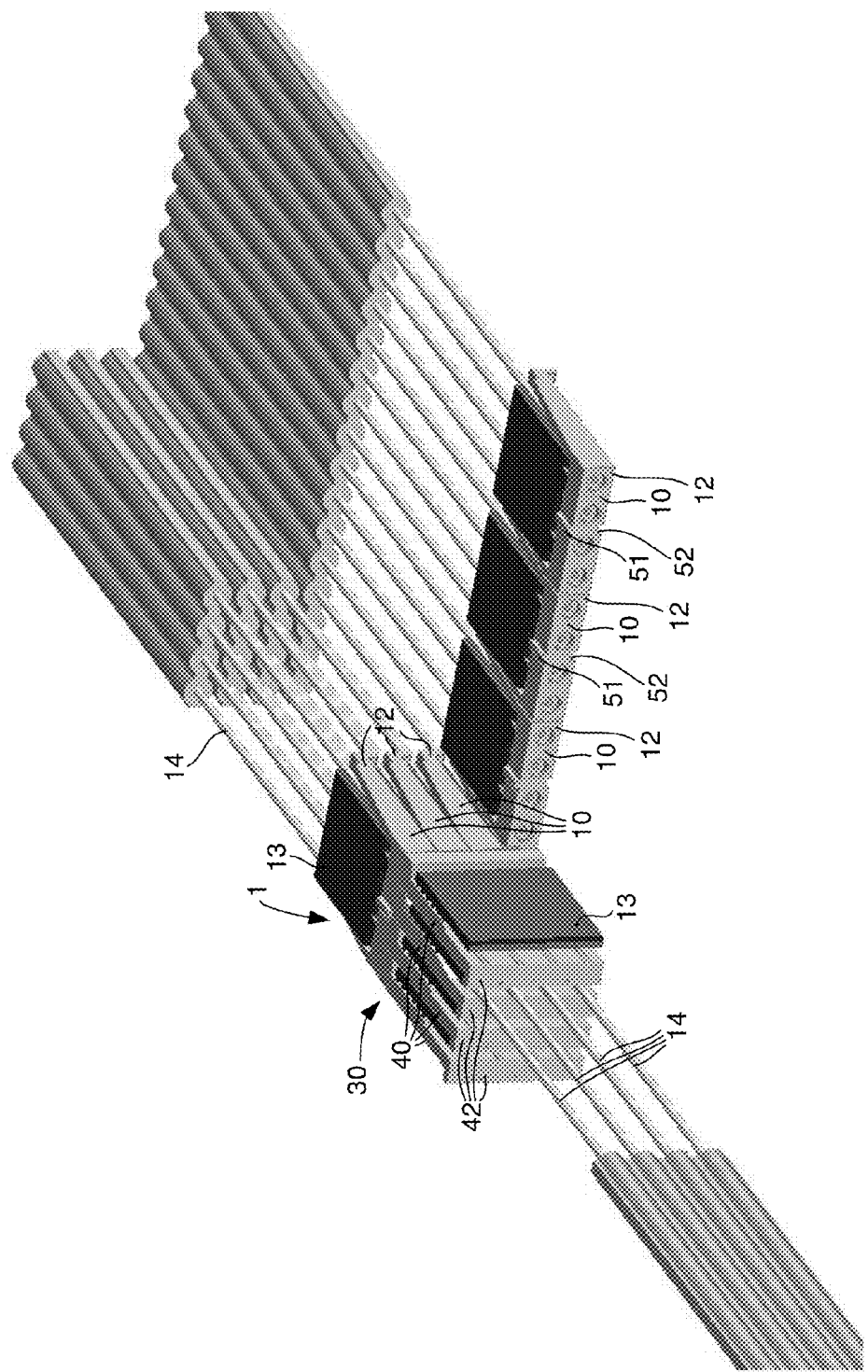
FIG. 4 illustrates a perspective view of the mated stacks of multi-optical fiber connector modules shown in FIG. 3 as the sizes of the stacks are increased by adding additional connector modules to the stacks.
Figure 5:
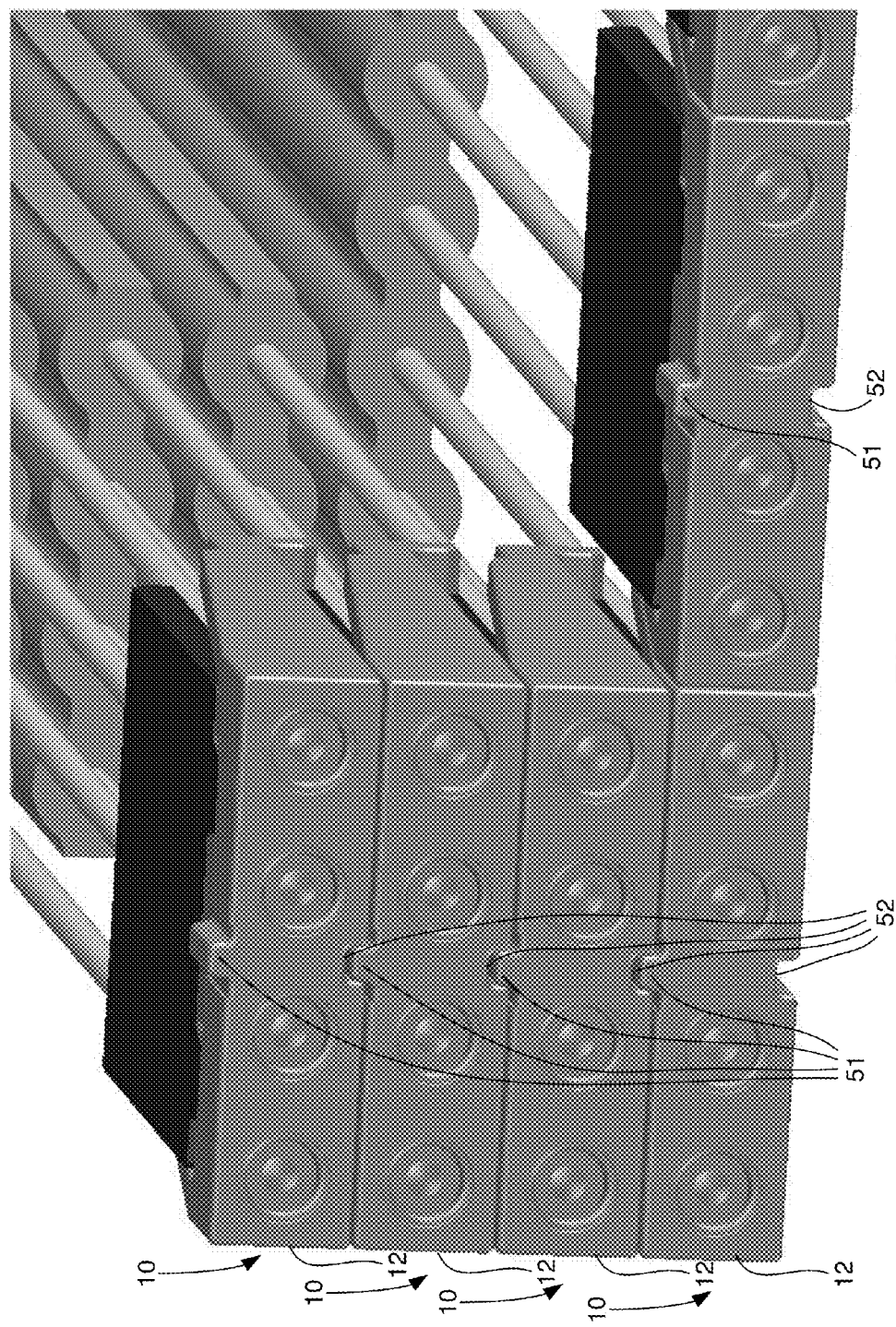
FIG. 5 illustrates an enlarged perspective view of a portion of the stack shown in FIG. 4.

FIG. 4 illustrates a perspective view of the mated stacks 1 and 30 of multi-optical fiber connector modules 10 and 40, respectively, shown in FIG. 3 as the sizes of the stacks 1 and 30 are increased by adding additional connector modules 10 and 40 to the stacks 1 and 30, respectively. FIG. 5 illustrates an enlarged perspective view of a portion of the stack 1 shown in FIG. 4. As shown in FIG. 4, the sizes of the stacks 1 and 30 can be increased by simply adding more connector modules 10 and 40 to the stacks 1 and 30, respectively. In FIG. 5, it can be seen that the module housings 12 have key features 51 and keyway features 52 on them that aid in assembling the stack 1. Specifically, the key features 51 of each module housing 12 mates with the keyway feature 52 of the module housing 12 above it in the stack 1. This ensures that the connector modules 10 will be aligned within the stack 1. The module housings 42 of the connector modules 40 of the stack 30 have identical key and keyway features 51 and 52 for aiding in the assembly of the stack 30, although they are not visible in FIG. 4. The invention is not limited with respect to the number of connector modules 10 and 40 that may be in the stacks 1 and 30, respectively.

Figure 6:
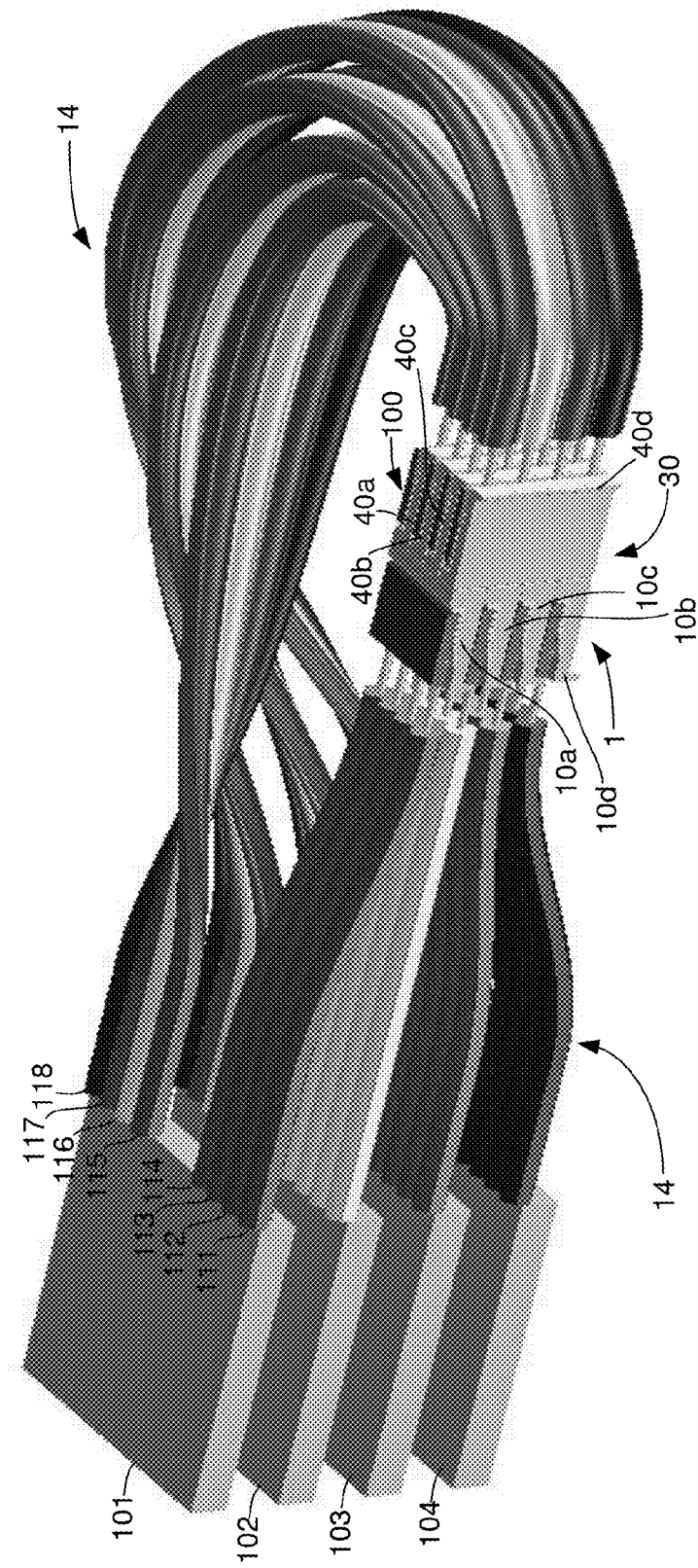
FIG. 6 illustrates a side perspective view of a cross-connect assembly in accordance with an illustrative embodiment that includes the mated stacks shown in FIG. 3 and optical fiber cables that are connected on first ends to the connector modules of the assembly and on second ends to PCBs.

FIG. 6 illustrates a side perspective view of a cross-connect assembly 100 in accordance with an illustrative embodiment that includes the mated stacks 1 and 30 shown in FIG. 3 and optical fiber cables 14 that are connected on first ends to the connector modules 10 and 40 of the assembly 100 and on second ends to PCBs 101, 102, 103 and 104. With respect to stack 1, it can be seen in FIG. 6 that the optical fiber cables 14 that are connected on their first ends to the connector module 10a are connected on their second ends to PCB 101. Likewise, the optical fiber cables 14 that are connected on their first ends to the connector module 10b are connected on their second ends to PCB 102. Likewise, the optical fiber cables 14 that are connected on their first ends to the connector module 10c are connected on their second ends to PCB 103. Likewise, the optical fiber cables 14 that are connected on their first ends to the connector module 10d are connected on their second ends to PCB 104.

With respect to stack 30, the four optical fiber cables 14 that are connected on their first ends to the connector module 40a are connected on their second ends to PCB 101. Likewise, the four optical fiber cables 14 that are connected on their first ends to the connector module 40b are connected on their second ends to PCB 102. Likewise, the four optical fiber cables 14 that are connected on their first ends to the connector module 40c are connected on their second ends to PCB 103. Likewise, the four optical fiber cables 14 that are connected on their first ends to the connector module 40d are connected on their second ends to PCB 104.

Because the stacks 1 and 30 are orthogonally mated with one another in the manner shown in FIG. 6, the optical cross-connect assembly 100 makes the following optical interconnections: the four output ports 111, 112, 113, and 114 of PCB 101 are interconnected with the input ports 115 of each of the PCBs 101, 102, 103, and 104; the four output ports 111, 112, 113, and 114 of PCB 102 are interconnected with the input ports 116 of each of the PCBs 101, 102, 103, and 104; the four output ports 111, 112, 113, and 114 of PCB 103 are interconnected with the input ports 117 of each of the PCBs 101, 102, 1003, and 104; and the four output ports 111, 112, 113, and 114 of PCB 104 are interconnected with input ports 118 of each of the PCBs 101, 102, 103, and 104.

Thus, every output port 111, 112, 113, and 114 of each of the PCBs 101, 102, 103, and 104 is optically interconnected with every input port 115, 116, 117, and 118 of each of the PCBs 101, 102, 103, and 104. This corresponds to a radix of four, although the cross-connect assembly can be created to accommodate any radix by increasing or reducing the sizes of the stacks 1 and 30 and the number of optical fiber cables 14. The PCBs 101, 102, 103, and 104 are typically contained inside of respective boxes (not shown) that are held within respective slots (not shown) of a rack (not shown). There are typically many devices or components (not shown) mounted on each PCB, such as one or more PEs (e.g., CPUs, ASICs, ASSPs), one or more memory devices, laser diodes and optical elements for each of the output ports 111-114, photodiodes and optical elements for each of the input ports 115-118, laser diode driver chips, receiver chips, etc.

It can be seen in FIG. 6 that the connections of the second ends of the optical fiber cables 14 to the PCBs 101-104 take up very little space on the PCBs 101-104, unlike the known larger-scale cross-connect solutions described above that have LC or MTP connectors that connect to ports on the PCBs or on the boxes in which the PCBs are held. Moving the optical cross-connections away from the PCBs or the boxes in which the PCBs are held allows a larger radix to be achieved because the optical cross-connect assembly 100 can be placed at virtually any location that has enough space to accommodate the assembly 100. The only potential limitation on where the cross-connect assembly 100 can be located is any limitation that there may be on the lengths of the fiber cables 14.

It should be noted that although four separate PCBs are shown in FIG. 6, the optical cross-connect assembly 100 could be used with a single large PCB in a case where all of the input and output ports 111-118 are disposed on the same large PCB. In such a case, the optical cross-connect assembly 100 would still provide the benefits of easily interconnecting every output port 111-114 of the PCB every input port 115-118 of the PCB. This may be useful, for example, where it is impractical or impossible to make a large number of electrical interconnections on the PCB, and so the interconnections are instead made optically in the optical cross-connect assembly 100.

Figure 7A:
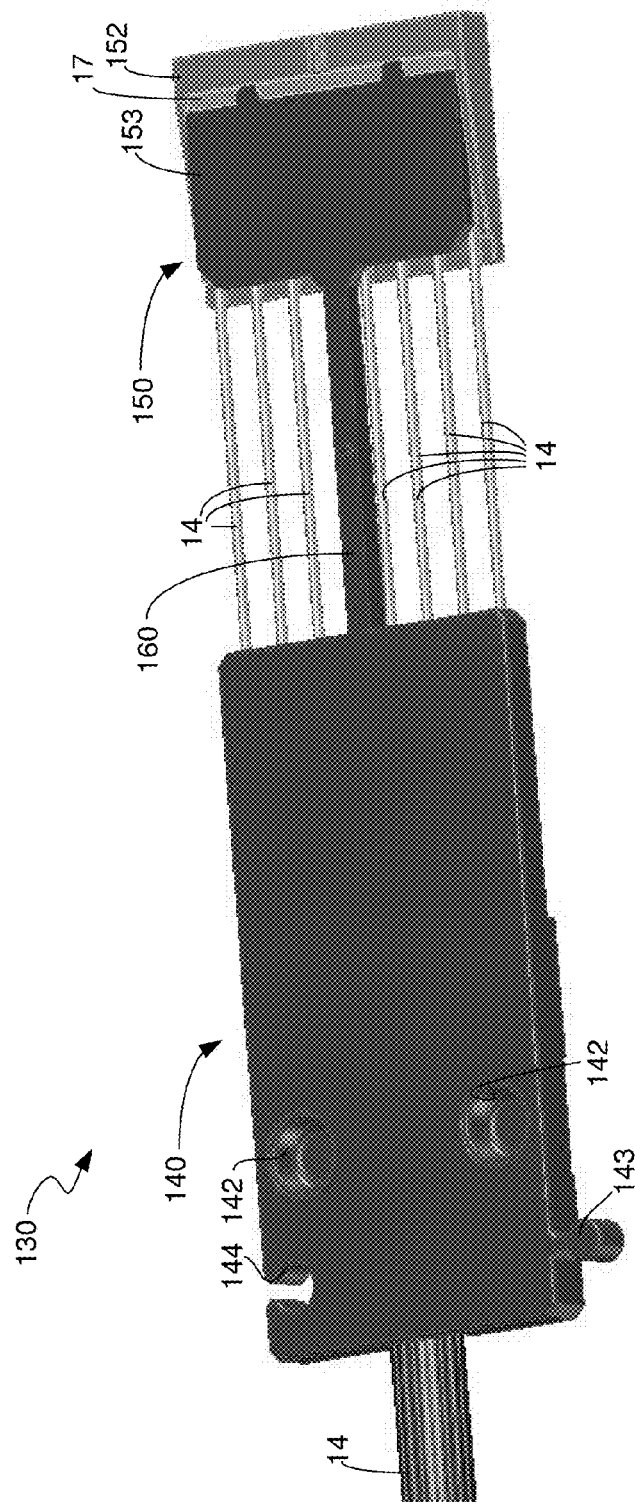
FIGS. 7A and 7B illustrate top and bottom perspective views, respectively, of a multi-optical fiber connector module assembly in accordance with another illustrative embodiment.
Figure 7B:
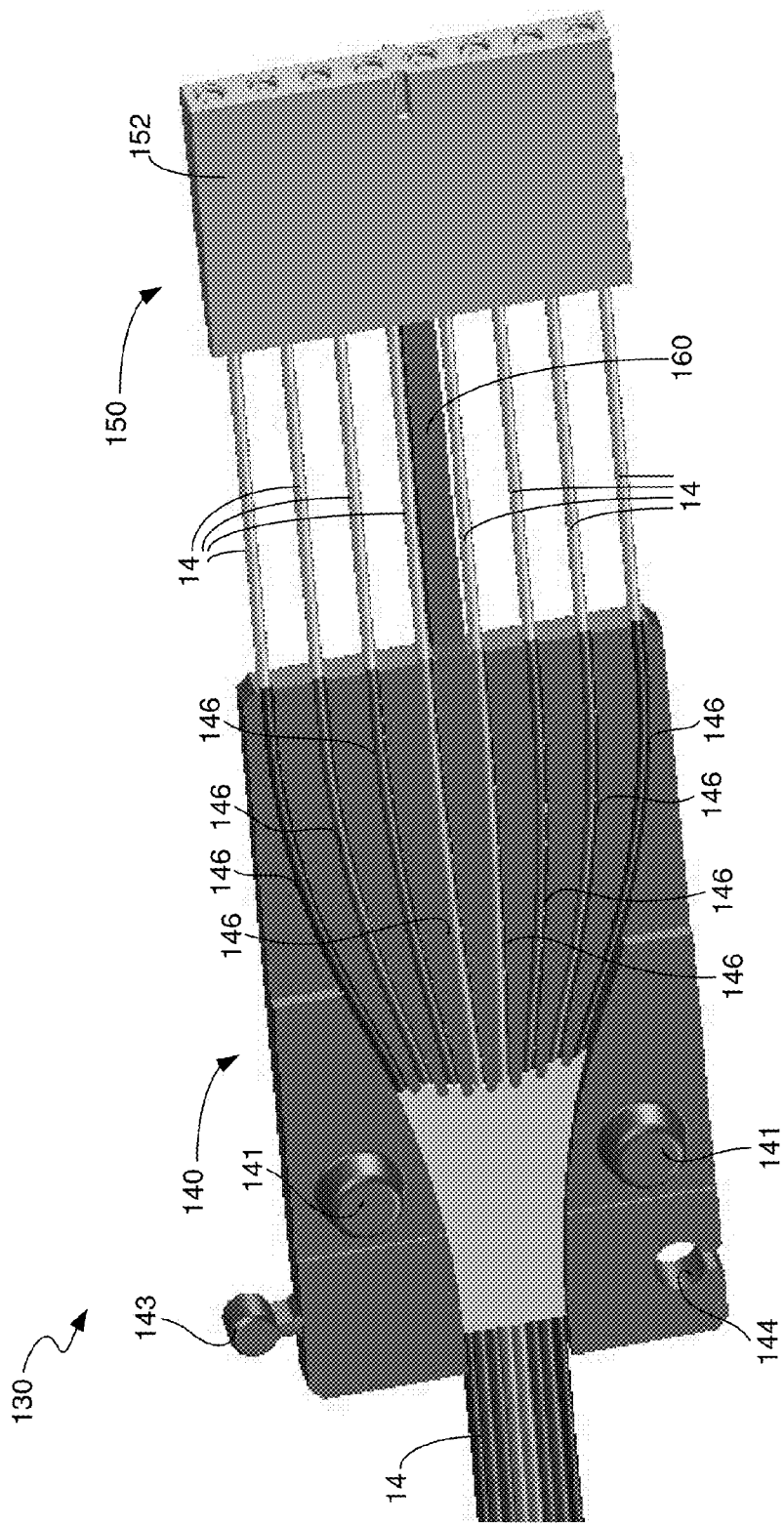
Figure 8:
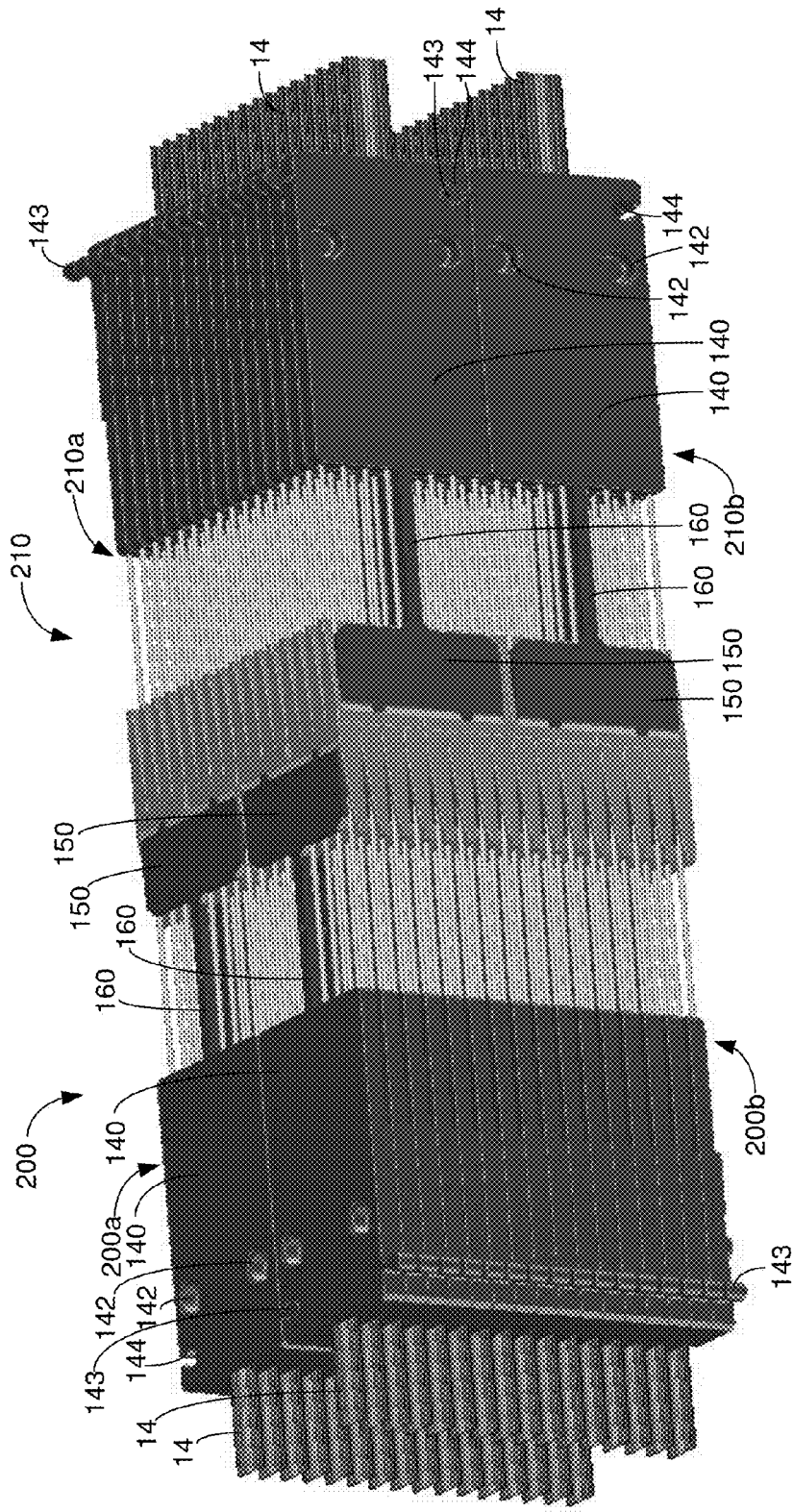
FIG. 8 illustrates a tope perspective view of two stacks of a plurality of the multi-optical fiber connector module assembly shown in FIGS. 7A and 7B orthogonally engaged with one another.

FIGS. 7A and 7B illustrate top and bottom perspective views, respectively, of a multi-optical fiber connector module assembly 130 in accordance with another illustrative embodiment. FIG. 8 illustrates a top perspective view of first and second stacks 200 and 210, respectively, of a plurality of the multi-optical fiber connector module assembly 130 shown in FIGS. 7A and 7B orthogonally engaged with one another. The stacks 200 and 210 shown in FIG. 8 include sub-stacks 200a, 200b and 210a, 210b, respectively. In accordance with this illustrative embodiment, each multi-optical fiber connector module assembly 130 includes a stack organizer 140 and a multi-optical fiber connector module 150. The connector module 150 is identical to the connector module 10 shown in FIG. 1 except that the housing 152 of the connector module 150 has eight grooves 16 formed in it instead of the four grooves 16 that are formed in the module housing 12 of the connector module 10. The cover 153 of the connector module 150 is identical to the cover 13 of the connector module 10 except that the cover 153 is larger in size than the cover 13 so that it is sufficiently large to cover eight instead of four fibers 14.

The assembly 130 includes a cantilever bridge 160 that mechanically couples the connector module 150 to the stack organizer 140. The stack organizer 140, the bridge 160 and the module housing 152 are typically all made of the same molded plastic material. The stack organizer 140 has engagement features that include pins 141 located on a lower surface of the organizer 140, holes 142 located on an upper surface of the organizer 140, tabs 143 located on one side of the organizer 140, and openings 144 located on the opposite side of the organizer 140. The holes 142 are complementary in shape to the shapes of the pins 141. Likewise, the openings 144 are complementary in shape to the shapes of the tabs 143.

With reference to FIG. 8, the holes 142 of the organizers 140 engage the respective pins 141 of the respective organizers 140 located beneath them in the sub-stacks 200a, 200b, 201a, and 210b. Similarly, the tabs 143 of the organizers 140 of the sub-stacks 200a and 210b engage the respective openings 144 of the respective organizers 140 located beside them in the sub-stacks 200b and 210a. In this way, the holes 142 and the pins 141 act as passive alignment devices for the organizers 140 that are within the same sub-stack 200a, 200b, 210a, and 210b, whereas the tabs 143 and the openings 144 act as passive alignment devices for the organizers 140 that are in adjacent sub-stacks 200a, 200b, 210a, and 210b.

The stack organizer 140 is a multi-purpose device. When the sub-stacks 200a and 200b are built through engagement of the respective passive alignment devices 141-144, the connector modules 150 of the sub-stacks 200a and 200b are brought into vertical coarse alignment with the other connector modules 150 that are within the same sub-stacks 200a and 200b and into lateral coarse alignment with the connector modules 140 that are within the adjacent sub-stacks 200a and 200b. Likewise, when the sub-stacks 210a and 210b are built through engagement of the respective passive alignment devices 141-144, the connector modules 150 of the sub-stacks 210a and 210b are brought into vertical coarse alignment with the other connector modules 150 that are within the same sub-stack 210a and 210b and into lateral coarse alignment with the connector modules 140 that are within the adjacent sub-stacks 210a and 210b.

The bridges 160 provide a floppy mechanical coupling of each connector module 150 to its respective organizer 140 that allows each connector module 150 to float, i.e., to have limited freedom of movement relative to its respective organizer 140. After the sub-stacks 210a and 210b have been engaged with one another via the passive alignment devices 141-144 of the respective connector modules 150, the stack 210 is rotated orthogonally (by 90 degrees) relative to the stack 200 and the stacks 200 and 210 are engaged with one another such that the connector modules 150 of stack 200 engage respective connector modules 150 of stack 210, as shown in FIG. 8. When the stacks 200 and 210 are being engaged with one another in this way, the floppy nature of the bridges 160 allows the front ends of the connector modules 150 of stack 200 to move to a limited extent, which allows the respective connector modules 150 to find and be brought into fine alignment with one another through engagement of the respective recessed and protruding circular ridge features 25 and 41 (FIG. 3). This feature allows large numbers of connector modules 150 to be easily and quickly brought into mechanical and optical alignment with one another to simultaneously establish a large number of optical cross-connections.

With reference again to FIG. 7B, another purpose of the stack organizer 140 is to spread the fibers 14 out so that there is a predetermined pitch between adjacent fibers 14 that is equal to the pitch between adjacent grooves 16 (FIG. 2) of the module housing 152. This spreading feature makes it easier to secure the ends of the fibers 14 to the module housing 152. Another purpose of the stack organizer 140 is as a cleave holder for holding the optical fibers 14 as they are stripped and cleaved. The holes 142 formed in the organizer 140 can be used to mate the organizer 140 with a fixture (not shown) that has pins that are shaped, sized and positioned to be received in the openings. Such a fixture may be disposed on a known stripper/cleaver tool (not shown) to allow the organizer 140 to be mounted on the tool, which would then be used to precisely strip and cleave the ends of the fibers 14.

Figure 9:
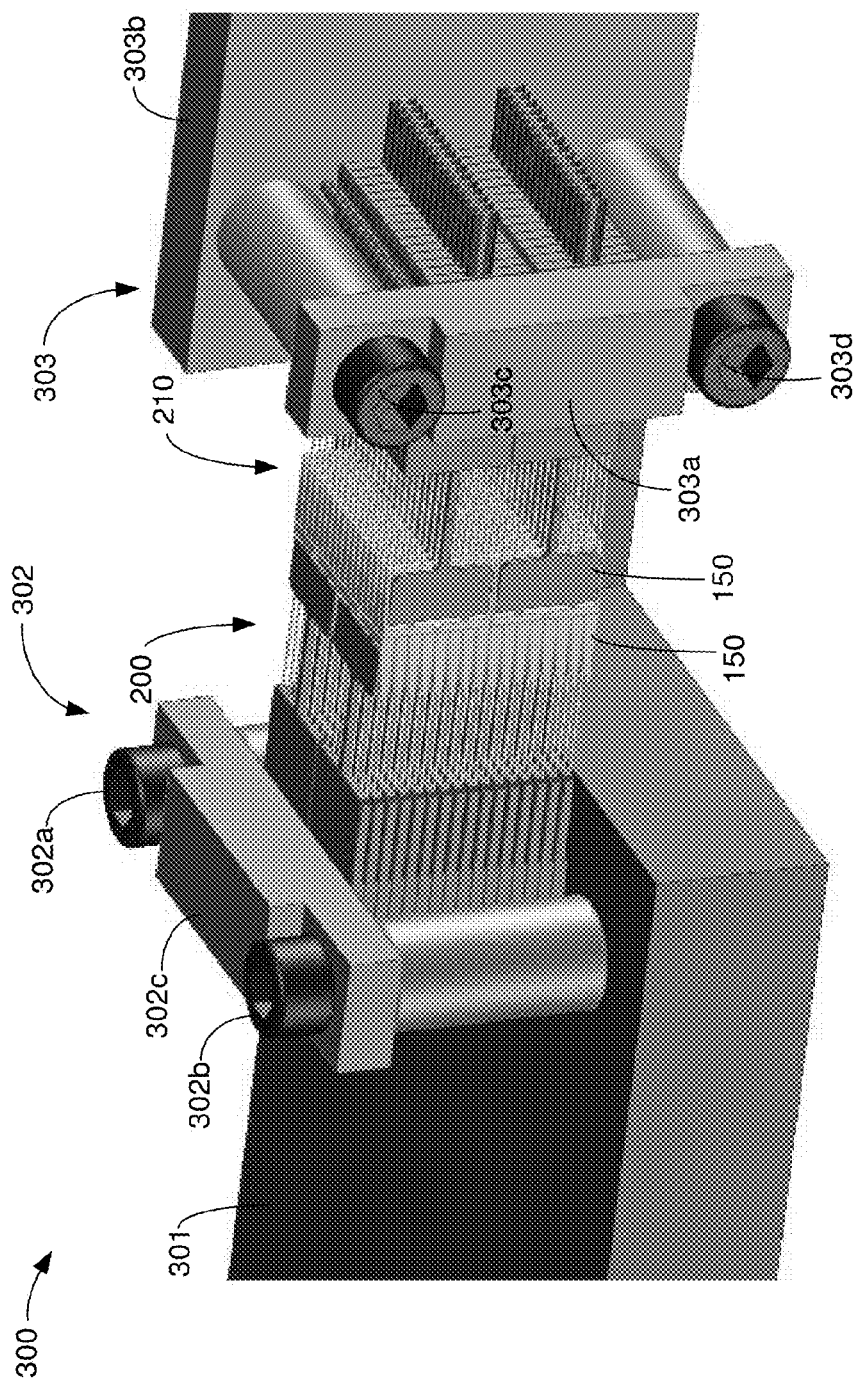
FIG. 9 illustrates a top perspective view of a holder for holding the optical cross-connect assembly shown in FIG. 8 in accordance with an illustrative embodiment.

FIG. 9 illustrates a top perspective view of a holder 300 for holding the optical cross-connect assembly shown in FIG. 8 in accordance with an illustrative embodiment. A similar holder could be used to hold the optical cross-connect assembly shown in FIG. 6. The invention is not limited to any particular configuration for the holder, so the holder 300 shown in FIG. 9 is merely an example of one possible configuration for the holder. The holder 300 has a base 301 on which first and second stack locking mechanisms 302 and 303 are mounted. The first stack locking mechanism 302 includes first and second hex screws 302a and 302b, and a vertically-movable lateral member 302c. The ends of the hex screws 302a and 302b that are opposite the heads of the hex screws 302a and 302b are threadingly engaged with respective tapped-and-threaded holes (not shown) formed in the base 301. The hex screws 302a and 302b are spaced apart by a distance that is slightly larger than width of the stack 200 to allow the stack 200 to be inserted in between the hex screws 302a and 302b. Likewise, the distance between the lateral member 302c and the upper surface of the base 301 is slightly larger than the height of the stack 200 to allow the stack 200 to be inserted in between them.

The second stack locking mechanism 303 includes a horizontally-movable vertical member 303a, a fixed vertical wall 303b, and hex screws 303c and 303d. The ends of the hex screws 303c and 303d that are opposite the heads of the hex screws 303c and 303d are threadingly engaged with respective tapped-and-threaded holes (not shown) formed in the vertical wall 303b. The horizontally-movable vertical member 303a and the wall 303b are spaced apart by a distance that is larger than the height of the stack 210 to allow the stack 210 to be inserted in between them. Likewise, the distance between the hex screws 303c and 303d is larger than the width of the stack 210 to allow the stack 210 to be inserted in between them.

After the stacks 200 and 210 have been inserted into the first and second stack locking mechanisms 302 and 303, respectively, and orthogonally coupled with each other, the heads of the hex screws 302a and 302b are turned in the clockwise direction by an assembly person to cause the vertically-movable lateral member 302c to move toward the base 301 until the stack 200 is firmly sandwiched between the lateral member 302c and the base 301. Similarly, the heads of the hex screws 303c and 303d of the second stack locking mechanism 303 are turned in the clockwise direction by the assembly person to cause the horizontally-movable vertical member 303a to move toward the fixed vertical wall 303b until the stack 210 is firmly sandwiched between the fixed vertical wall 303b and the horizontally-movable vertical member 303a. In this way, the holder 300 holds the cross-connect assembly to prevent the connector modules 150 of the stack 200 from becoming disengaged from the connector modules 150 of the stack 210.

It can be seen from the foregoing description that the optical cross-connect assemblies described herein provide many advantages with respect to scalability, interconnection density and versatility. As described above, the stacks are easily assembled and orthogonally coupled with one another to make the optical interconnections. Another advantage of the optical cross-connect assembly is that it is relatively inexpensive to manufacture due to the fact that they are made of molded plastic and the same design is used for all of the modules with the exception of them having male or female fine alignment features.

It should be noted that the invention has been described with reference to illustrative, or exemplary, embodiments in order to demonstrate the principles and concepts of the invention. As will be understood by those of skill in the art, the invention is not limited to the illustrative embodiments described herein. For example, the optical cross-connect assembly is not limited with respect to the type or configuration of the multi-optical fiber connector module that is used in the stacks, with respect to the number of connector modules that are used in the stacks, or with respect to the number of channels that each connector module has. Persons skilled in the art will understand, in view of the description provided herein, that a variety of modifications can be made to the embodiments described herein and that all such modifications are within the scope of the invention.

What is claimed is:

1. An optical cross-connect assembly comprising:
   a first stack of first multi-optical fiber connector modules, each of the first connector modules including a first module housing in which ends of a plurality of first optical fibers are held in fixed positions, each of the first module housings having a plurality of first lenses disposed in respective first openings formed in a wall of the first module housing, wherein the first openings extend through the wall and through a front surface of the first module housing, the ends of the first optical fibers being positioned adjacent the respective openings such that light is coupled between the respective first lenses and the respective ends of the first optical fibers; and
   a second stack of second multi-optical fiber connector modules orthogonally mechanically coupled to the first stack of first multi-optical fiber connector modules, each of the second connector modules including a second module housing in which ends of a plurality of second optical fibers are held in fixed positions, each of the second module housings having a plurality of second lenses disposed in respective second openings formed in a wall of the second module housing, wherein the second openings extend through the wall of the second module housing and through a front surface of the second module housing, the ends of the second optical fibers being positioned adjacent the respective second openings such that light is coupled between the respective second lenses and the respective ends of the second optical fibers, and wherein the orthogonal mechanical coupling of the first and second stacks is such that respective first openings of each of the first module housings are optically aligned with respective second openings of all of the second module housings and such that respective second openings of each of the second module housings are optically aligned with respective first openings of all of the first module housings.

2. The optical cross-connect assembly of claim 1, wherein each of the first and second module housings has an upper surface in which a plurality of grooves are formed for holding the respective ends of the respective optical fibers, each groove having a first portion and a second portion, the first portion of each groove being generally semi-cylindrical in shape such that the first portion is complementary in shape to a cylindrically-shaped outer surface of a jacket of an optical fiber, the second portion of each groove being V-shaped, wherein each of the optical fibers includes a jacketed fiber portion that is held within a respective first portion of a respective groove and an unjacketed fiber portion that is held within a respective second portion of a respective groove.

3. The optical cross-connect assembly of claim 2, wherein each of the first and second multi-optical fiber connector modules includes a cover comprising an unfilled plastic molded part having a plurality of deformable features disposed on a lower surface thereof, wherein the deformable features of the cover are in contact with the unjacketed portions of optical fibers and are permanently deformed about the respective unjacketed portions of the optical fibers at locations where the deformable features are in contact with the unjacketed fiber portions, and wherein the cover and the ends of the optical fibers are secured to the module housing of the respective connector module by an adhesive material.

4. The optical cross-connect assembly of claim 1, wherein each of the first module housings has a recessed circular ridge feature formed in each of the openings of the first module housing near the front surface of the first module housing, and wherein each of the second module housings has a protruding circular ridge feature formed in each of the openings of the second module housing near the front surface of the second module housing, and wherein the recessed circular ridge features are mated with respective protruding circular ridge features when the first and second stacks are orthogonally mechanically coupled together.

5. The optical cross-connect assembly of claim 1, wherein each of the first module housings is mechanically coupled on a back end thereof to a back end of an adjacent first module housing in the first stack.

6. The optical cross-connect assembly of claim 5, wherein each of the second module housings is mechanically coupled on a back end thereof to an adjacent second module housing in the second stack.

7. The optical cross-connect assembly of claim 5, wherein the mechanical coupling of the back ends of the first module housings is via respective spot welds.

8. The optical cross-connect assembly of claim 5, wherein the mechanical coupling of the back ends of the first module housings is via respective bonds of cured adhesive material.

9. The optical cross-connect assembly of claim 5, wherein front ends of the first module housings are free to move to a limited extent such that the front ends float into alignment with front ends of respective second module housings when the first and second stacks are orthogonally mechanically coupled together.

10. The optical cross-connect assembly of claim 1, further comprising:
a first stack of first stack organizers, each first stack organizer being mechanically coupled to a back end of a respective first module housing by a respective first cantilever bridge, wherein the mechanically couplings of the first module housings to the respective stack organizers by the respective first cantilever bridges allows front ends of the respective first module housings to move to a limited extent such that the front ends of the first module housings float into alignment with front ends of respective second module housings when the first and second stacks are orthogonally mechanically coupled together.

11. The optical cross-connect assembly of claim 1, further comprising:
a second stack of second stack organizers, each second stack organizer being mechanically coupled to a back end of a respective second module housings by a respective second cantilever bridge, wherein the mechanically couplings of the second module housings to the respective second stack organizers by the respective second cantilever bridges allows front ends of the respective second module housings to move to a limited extent such that the front ends of the second module housings float into alignment with front ends of respective second module housings when the first and second stacks are orthogonally mechanically coupled together.

12. A method for optically cross-connecting a first component with a second component, the method comprising:
providing a first stack of first multi-optical fiber connector modules, each of the first connector modules including a first module housing in which first ends of a plurality of first optical fibers are held in fixed positions, each of the first module housings having a plurality of first lenses disposed in respective first openings formed in a wall of the first module housing, wherein the first openings extend through the wall and through a front surface of the first module housing, the first ends of the first optical fibers being positioned adjacent the respective openings such that light is coupled between the respective first lenses and the respective first ends of the first optical fibers;
mechanically and optically coupling second ends of the first plurality of optical fibers to a first component;
providing a second stack of second multi-optical fiber connector modules, each of the second connector modules including a second module housing in which first ends of a plurality of second optical fibers are held in fixed positions, each of the second module housings having a plurality of second lenses disposed in respective second openings formed in a wall of the second module housing, wherein the second openings extend through the wall of the second module housing and through a front surface of the second module housing, the first ends of the second optical fibers being positioned adjacent the respective second openings such that light is coupled between the respective second lenses and the respective first ends of the second optical fibers;

mechanically and optically coupling second ends of the second plurality of optical fibers to a second component; and orthogonally mechanically coupling the first stack of connector modules with the second stack of connector module such that respective first openings of each of the first module housings are optically aligned with respective second openings of all of the second module housings and such that respective second openings of each of the second module housings are optically aligned with respective first openings of all of the first module housings.

13. The method of claim 12, wherein each of the first and second module housings has an upper surface in which a plurality of grooves are formed for holding the respective first ends of the respective optical fibers, each groove having a first portion and a second portion, the first portion of each groove being generally semi-cylindrical in shape such that the first portion is complementary in shape to a cylindrically-shaped outer surface of a jacket of an optical fiber, the second portion of each groove being V-shaped, wherein each of the optical fibers includes a jacketed fiber portion that is held within a respective first portion of a respective groove and an unjacketed fiber portion that is held within a respective second portion of a respective groove.

14. The method of claim 13, wherein each of the first and second multi-optical fiber connector modules includes a cover comprising an unfilled plastic molded part having a plurality of deformable features disposed on a lower surface thereof, wherein the deformable features of the cover are in contact with the unjacketed portions of the optical fibers and are permanently deformed about the respective unjacketed portions of the optical fibers at locations where the deformable features are in contact with the unjacketed fiber portions, and wherein the cover and the first ends of the optical fibers are secured to the respective module housing of the respective connector module by an adhesive material.

15. The method of claim 12, wherein each of the first module housings has a recessed circular ridge feature formed in each of the openings of the first module housing near the front surface of the first module housing, and wherein each of the second module housings has a protruding circular ridge feature formed in each of the openings of the second module housing near the front surface of the second module housing, and wherein the recessed circular ridge features are mated with respective protruding circular ridge features when the first and second stacks are orthogonally mechanically coupled together.

16. The method of claim 12, wherein each of the first module housings is mechanically coupled on a back end thereof to a back end of an adjacent first module housing in the first stack.

17. The method of claim 16, wherein each of the second module housings is mechanically coupled on a back end thereof to an adjacent second module housing in the second stack.

18. The method of claim 16, wherein the mechanical coupling of the back ends of the first module housings is via respective spot welds.

19. The method of claim 16, wherein the mechanical coupling of the back ends of the first module housings is via respective bonds of cured adhesive material.

20. The method of claim 16, wherein front ends of the first module housings are free to move to a limited extent such that the front ends float into alignment with front ends of respective second module housings when the first and second stacks are orthogonally mechanically coupled together.

* * * * *